R. B. BURTON.
POWER DRIVEN ROTARY FAN.
APPLICATION FILED NOV. 2, 1916.

1,237,866.

Patented Aug. 21, 1917.

WITNESSES:
Chas. H. Parsons
Chas. L. Heisler

INVENTOR
Ralph B. Burton.

UNITED STATES PATENT OFFICE.

RALPH B. BURTON, OF SCHENECTADY, NEW YORK.

POWER-DRIVEN ROTARY FAN.

1,237,866. Specification of Letters Patent. Patented Aug. 21, 1917.

Application filed November 2, 1916. Serial No. 129,219.

*To all whom it may concern:*

Be it known that I, RALPH BROMLEY BURTON, of Schenectady, in the county of Schenectady and State of New York, have invented a certain new and useful Improvement in Power-Driven Rotary Fans, of which improvement the following is a specification.

My invention relates more particularly to a fan adapted for cooling the motor cylinders of an automobile and other internal explosion engines which are frequently started or stopped with a quite sudden acceleration or retardation of speed.

The object of my invention is to provide a means for cushioning and lessening the suddenness of the application, of accelerating, or retarding forces when transmitted to the fan from an internal explosion engine to which it may be coupled, thereby lessening the stresses in the frail fan structure; to reduce journal pressure in the fan and to lessen the shock on the means for coupling the fan to the motor, and thereby reducing the tendency to break or wear the coupling means, when comprising either a pair of gears, a chain, or belt.

The improvement claimed is hereinafter fully set forth.

Figure 1:
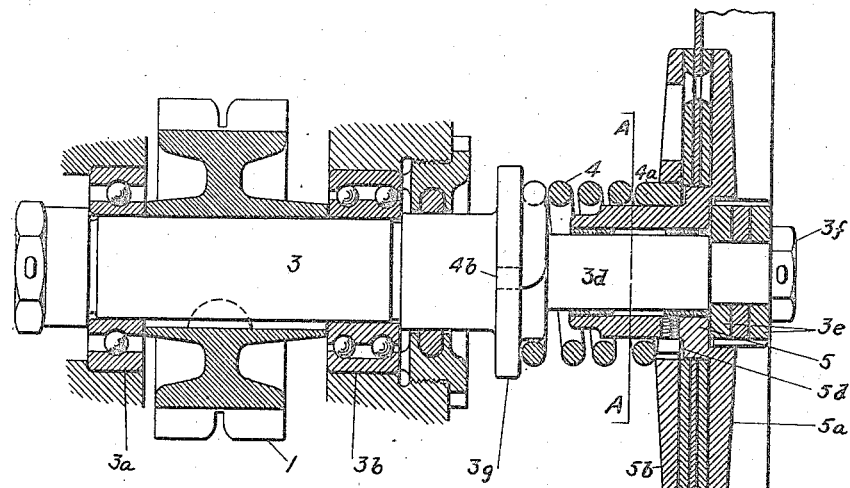
Figure 2:
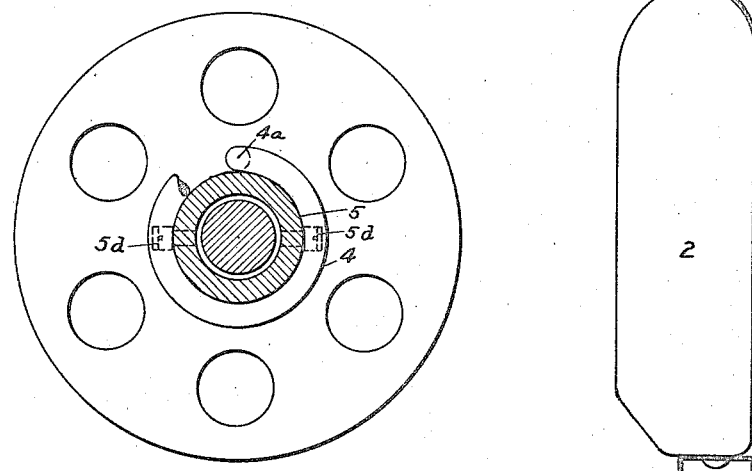

In the accompanying drawings, Figure 1 is a vertical longitudinal sectional detail elevation of a fan which embodies my invention and illustrates its construction when adapted to be driven by an automobile engine, part of the fan being broken away to permit making an enlarged view; Fig. 2, a transverse sectional view taken on the plane A A, of Fig. 1.

My invention is herein exemplified in providing a cushioning and transmitting means between the automobile motor driven gear 1, and the motor cooling fan 2, which are mounted upon a spindle 3. The spindle is rotated by the gear fastened thereto, and is pivotally supported by the ball bearings $3^a$, and $3^b$, which are embraced by a stationary support of usual construction, and which is, therefore, not shown. The gear is coupled to and driven from an internal explosion engine by means of a chain, belt, or gear, which are of usual construction and, therefore, are not illustrated. The fan has a predetermined amount of spring resisted rotation upon the spindle journal $3^d$. It is positioned to resist thrust from the helical spring 4, by the washers $3^e$ and the nut $3^f$.

A friction disk, $5^a$, is formed on the fan hub 5. A supplementary disk $5^b$, loosely encircles the fan hub and is driven by a pair of screws $5^d$, which project from the fan hub and engage with corresponding notches formed in the bore of the supplementary disk, as illustrated and which is of usual construction. The fan 2, is interposed between the disks so as to be driven by frictional contact therewith. The spring 4, encircles the spindle, abuts against the supplementary disk, and is engaged therewith by the spring hook $4^a$. A hook $4^b$, is also formed on the opposite end of the spring and engages the corresponding hole formed in the spindle flange $3^g$, so as to resiliently transmit torsional forces from the spindle to the fan. The construction, as described, causes the double functioned helical spring 4, to drive the fan by friction, due to its compressive force against the supplementary disk, and also to drive the fan by the torque resiliently transmitted by the spring from the flange $3^g$, to the supplementary disk in a manner to permit a predetermined amount of spring resisted motion between the spindle journal $3^d$, and the fan. Furthermore, when the motor is suddenly started, a limited amount of slip will take place between the fan and the disks.

When the motor is so suddenly started, in a manner which by rapid acceleration would destroy a rigidly coupled fan, the gear 1, instantly rotates the spindle 3, at maximum speed; the inertness of the fan causes it to accelerate slowly and compensate for the difference in speeds by slipping between the disks. The spring, during this period of rapid acceleration, is twisted about its axis an amount determined by its torsional resistance. The compressive force of the spring is made sufficient to readily drive the fan, without slipping between the disks, after it has come to a speed corresponding to that of the motor speed. Sudden changes of rotation and shocks from the motor will be compensated for or cushioned by the torsional resilience of the spring, and when very excessive, by slippage between the disks.

I claim as my invention and desire to secure by Letters Patent:

1. The combination with a fan; of means for revolubly supporting the fan; driving means; a helical spring; a friction disk held in frictional contact with the fan by the spring, and means for coupling the spring to the driving means and to the disk so as to resiliently transmit rotative forces to the fan, for the purpose of guarding the fan from injury due to a sudden acceleration or retardation of the driving means.

2. The combination of a driving spindle; a fan revolubly journaled thereon; a flange formed on the spindle; a helical spring encircling the spindle and abutting against the flange; a disk held in frictional contact with the fan by the spring, and means for fastening the spring to the flange so as to resiliently transmit torsional or rotative forces to the fan, for the purpose of preventing injury thereto from sudden accelerations or retardations of the driving spindle.

RALPH B. BURTON.

Witnesses:
CHAS. L. HEISLER,
ELIZEBETH R. FINEGAN.